United States Patent
Cavallaro et al.

(10) Patent No.: US 6,378,737 B1
(45) Date of Patent: *Apr. 30, 2002

(54) CONTROLLABLE LIQUID DISPENSING DEVICE

(75) Inventors: William A. Cavallaro, Bradford, MA (US); Jeffrey P. Fugere, Sandown, NH (US); Kenneth C. Crouch, North Andover; Stephen M. Franklin, Haverhill, both of MA (US)

(73) Assignee: Speedline Technologies, Inc., Franklin, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/611,502

(22) Filed: Jul. 7, 2000

Related U.S. Application Data

(63) Continuation of application No. 09/104,457, filed on Jun. 24, 1998, now Pat. No. 6,085,943, which is a continuation-in-part of application No. 08/885,005, filed on Jun. 30, 1997, now Pat. No. 5,957,343.

(51) Int. Cl.⁷ .............................................. B65D 88/54
(52) U.S. Cl. ........................ 222/309; 222/380; 222/504
(58) Field of Search .............................. 222/309, 383.1, 222/434, 438, 439, 440, 442, 451, 453, 380, 504

(56) References Cited

U.S. PATENT DOCUMENTS

| | | | |
|---|---|---|---|
| 1,184,779 A | 5/1916 | Shaw | |
| 1,252,875 A | 1/1918 | Ashmusen | |
| 1,699,236 A | 1/1929 | Goldrick | |
| 2,274,241 A | 2/1942 | Lemanski | 103/2 |
| 2,410,517 A | 11/1946 | Muller et al. | 103/41 |
| 3,337,096 A | * 8/1967 | Brown | 222/380 |
| 3,586,129 A | 6/1971 | Cass | 184/7 |

(List continued on next page.)

FOREIGN PATENT DOCUMENTS

| | | |
|---|---|---|
| CH | 684850 A5 | 1/1995 |
| GB | 114905 | 8/2001 |
| WO | WO 97/13586 | 4/1997 |
| WO | WO 97/18054 | 5/1997 |

OTHER PUBLICATIONS

Engel, J., "Selecting The Proper Dispensing Tip," Reprinted from Surface Mount Technology, Oct. 1990, pps. 3.

Hogan, B.J, "Adhesive Dispenser Provides ±2% Volume Repeatability," Reprinted from Design News, Apr. 11, 1994, pps. 2.

International Search Report dated Oct. 29, 1998.

*Primary Examiner*—Philippe Derakshani
(74) *Attorney, Agent, or Firm*—Mintz, Levin, Cohn, Ferris, Glovsky and Popeo, P.C.

(57) ABSTRACT

A dispensing system for dispensing a quantity of material includes an inlet port to receive the material, an outlet port from which the material is dispensed from the dispensing system, a housing having an inner chamber with an adjustable volume, a first valve operable in one of an open mode of operation and a closed mode of operation. The first valve is disposed between the inlet port and the inner chamber in such a manner that when the first valve is operating in the open mode, material may flow from the inlet port into the inner chamber, and when the first valve is operating in the closed mode, material is prevented from flowing from the inlet port into the inner chamber. The dispensing system also includes a second valve operable in one of an open mode of operation and a closed mode of operation. The second valve is disposed between the outlet port and the inner chamber in such a manner that when the second valve is operating in the open mode, material may flow from the inner chamber to the outlet port, and when the second valve is operating in the closed position, material is prevented from flowing from the inner chamber to the outlet port.

15 Claims, 8 Drawing Sheets

U.S. PATENT DOCUMENTS

| | | | |
|---|---|---|---|
| 3,893,627 A | * 7/1975 | Siczek et al. | 222/380 |
| 3,921,865 A | 11/1975 | Klug | 222/447 |
| 4,043,711 A | 8/1977 | Seino | 417/469 |
| 4,572,103 A | 2/1986 | Engel | 118/697 |
| 4,645,431 A | 2/1987 | Spencer et al. | 417/401 |
| 4,646,969 A | 3/1987 | Sorm et al. | 239/106 |
| 4,708,269 A | * 11/1987 | Willerding | 222/309 |
| 4,848,606 A | 7/1989 | Taguchi et al. | 222/333 |
| 4,869,404 A | * 9/1989 | Elliot | 222/380 |
| 4,892,228 A | * 1/1990 | Yano | 222/380 |
| 4,967,933 A | 11/1990 | Maiorca et al. | 222/1 |
| 4,974,755 A | * 12/1990 | Sonntag | 222/309 |
| 5,044,900 A | 9/1991 | Cavallaro | 417/466 |
| 5,052,338 A | 10/1991 | Maiorca et al. | 118/668 |
| 5,110,615 A | 5/1992 | Maiorca et al. | 427/8 |
| 5,320,250 A | 6/1994 | La et al. | 222/1 |
| 5,465,879 A | 11/1995 | La et al. | 222/189.06 |
| 5,505,777 A | 4/1996 | Ciardella et al. | 118/663 |
| 5,666,325 A | 9/1997 | Belser et al. | 367/95 |
| 5,957,343 A | * 9/1999 | Cavallaro | 222/504 |
| 6,085,943 A | * 7/2000 | Cavallaro et al. | 222/309 |

* cited by examiner

CONTROLLABLE LIQUID DISPENSING DEVICE

This application is a continuation application of U.S. patent application Ser. No. 09/104,457 filed Jun. 24, 1998, now U.S. Pat. No. 6,085,943, which was a continuation in part of U.S. patent application Ser. No. 08/885,005, filed Jun. 30, 1997 now U.S. Pat. No. 5,957,343, both of which are incorporated herein by reference.

FIELD OF THE INVENTION

The present invention relates to a dispensing device for various liquids, and more particularly to a liquid dispensing device which allows precise control over the amount of liquid dispensed.

BACKGROUND OF THE INVENTION

Several types of prior art dispensing systems are used for dispensing metered amounts of liquid or paste for a variety of applications. One such application is in the assembly of printed circuit boards and integrated circuit chips, wherein dispensing systems are used in the process of encapsulating integrated circuits with an encapsulant material and in the process of under filling flip integrated circuit chips with an encapsulant. Prior art dispensing systems are also used for dispensing dots or balls of liquid epoxy or solder onto circuit boards and integrated circuits. The liquid epoxy and solder is primarily used to connect components to a circuit board or to connect components within an integrated circuit. The dispensing systems described above include those manufactured and distributed by Camelot Systems, Inc. of Haverhill, Mass., the assignee of the present invention under the name CAM/ALOT®.

In a typical dispensing system, a pump and dispenser assembly is mounted to a moving assembly for moving the pump and dispenser assembly along three mutually orthogonal axes (x, y, z), by servomotors controlled by a computer system or controller. To dispense a volume of liquid on a circuit board or some other substrate at a desired location, the pump and dispenser assembly is moved along the horizontal x and y axes until it is located over the desired location. The pump and dispenser assembly is then lowered along the vertical z axis until the nozzle is at an appropriate height over the substrate. The pump and dispenser assembly dispenses a predetermined volume of liquid, is then raised along the z axis, moved along the x and y axes to a next desired location, and is lowered along the vertical z axis to dispense the predetermined volume of liquid at the next location.

In dispensing applications such as those described above, the accuracy of the volume of liquid dispensed by the system is an important feature of the system. In one prior art dispensing system, the pump and dispenser assembly includes an auguring screw housed in an auguring chamber within a dispenser housing. The auguring screw is rotated within the chamber to provide a controlled amount of liquid. The pump and dispenser assembly has a nozzle for dispensing material onto a substrate. The liquid to be dispensed by the pump and dispenser assembly is contained in a vertical, cylindrical syringe coupled to the dispenser housing by a bracket. The syringe has a top piece having clamps that provide a pressure tight seal between the syringe and the top piece. The top piece includes an adapter for coupling to an air line to receive pressurized air. The pressurized air is used to force the dispensing material from the syringe into the pump and dispenser assembly.

The prior art dispensing systems described above are effective in dispensing material onto a substrate, however, it is desirable to have a dispensing system having greater precision in controlling the amount of material to be dispensed.

SUMMARY OF THE INVENTION

Embodiments of the present invention provide an apparatus and method for dispensing a controlled amount of material onto a substrate.

In accordance with one embodiment of the present invention, a liquid dispensing system includes a material control device which cooperates with a switching device and a sealing device contained within a standard dispensing chamber. A standard power control system, such as a servomotor, in communication with the material control device, is used to selectively adjust the position of the material control device to dispense a controlled amount of material. When the sealing device is in a first position and the material control device is compressed a predetermined amount, a vacuum is created which draws material into the dispensing chamber. The material remains within the dispensing chamber as the sealing device in the first position seals an opening leading to a dispensing tip. After a predetermined amount of material is drawn into the dispensing chamber, the switching device moves the sealing device to a second position. This creates a seal to prevent further material from entering into the dispensing chamber. In this second position, the sealing device allows material to exit through the opening at the dispensing tip. By expanding the material control device, the material within the dispensing chamber is forced out the opening of the dispensing tip. In this manner, the precise amount of material to be dispensed onto the substrate can be controlled.

In another embodiment, the material control device includes a screw and piston system. The piston has an opening in one portion thereof to be received by the screw by corresponding engagement teeth. As the piston mates with the screw, it is drawn away from the dispensing chamber. The screw can be disengaged from the piston by a reverse turning action on the screw.

In another embodiment, the switching device is a pneumatic cylinder which is connected to the head of the sealing device which may protrude from the dispensing device.

In another embodiment, the dispensing device includes a retainer, having tapered edges to meet and seal with a first sealing portion of the sealing device when the sealing device is in the first position.

In another embodiment of the present invention, the switching device has a failsafe position to prevent material from leaking from the dispensing device by ensuring that the sealing device remains in a closed position over the dispensing tip.

In yet another embodiment, an adjustment means is provided at the base of the dispensing chamber which allows for adjustment of the length of the opening for the dispensing tip.

Another embodiment of the present invention is directed to a dispensing system for dispensing a quantity of material. The dispensing system includes an inlet port to receive material, an outlet port from which the material is dispensed from the dispensing system, a housing including an inner chamber having an adjustable volume, and a first valve operable in one of an open mode of operation and a closed mode of operation. The first valve is disposed between the inlet port and the inner chamber in such a manner that when the first valve is operating in the open mode, material may flow from the inlet port into the inner chamber, and when the first valve is operating in the closed mode, material is prevented from flowing from the inlet port into the inner chamber. The dispensing system further includes a second valve operable in one of an open mode of operation and a closed mode of operation. The second valve is disposed between the outlet port and the inner chamber in such a manner that when the second valve is operating in the open mode, material may flow from the inner chamber to the outlet port, and when the second valve is operating in the closed position, material is prevented from flowing from the inner chamber to the outlet port.

In one embodiment, the first valve is constructed and arranged such that the mode of operation of the first valve is controlled in part based on a difference in pressure of material being received in the inlet port and pressure of material in the inner chamber, and the second valve is constructed and arranged such that the mode of operation of the second valve is controlled in part based on a difference in pressure of material in the inner chamber and ambient air pressure at the outlet port.

In still another embodiment, the first valve includes a first spring providing a spring force that causes the first valve to operate in the closed mode of operation unless the pressure of the material in the inlet port is greater than the sum of pressure provided by the spring force and the pressure of material in the inner chamber, and the second valve includes a second spring providing a spring force that causes the second valve to operate in the closed mode of operation unless the pressure of the material in the inner chamber is greater than the sum of pressure provided by the spring force of the second spring and the ambient air pressure at the outlet port.

In still another embodiment, the housing of the dispensing system includes a piston and a ball screw coupled to the piston. The piston is movable within the inner chamber to vary the volume of the inner chamber.

In yet another embodiment, the dispensing system further includes a motor coupled to the ball screw through a coupling nut to control a position of the ball screw and to thereby control a position of the piston in the inner chamber.

In another embodiment, the dispensing system further includes a syringe containing material to be dispensed by the dispensing system, and a syringe cover that provides pressure to the material in the syringe to cause the material to flow out of the syringe and into the inlet port of the dispensing system.

In another embodiment of the present invention, a dispensing system for dispensing a quantity of material includes an inlet port to receive material, an outlet port from which the material is dispensed from the dispensing system, a housing including an inner chamber, means for decreasing air pressure within the inner chamber to fill the inner chamber with material through the inlet port, and means for increasing pressure on the material in the inner chamber to force material from the inner chamber to dispense the material onto a substrate.

Another embodiment of the present invention is directed to a method of dispensing material in a dispensing system. The dispensing system has an inlet port to receive material, an outlet port from which the material is dispensed from the dispensing system, and a housing including an inner chamber. The method includes steps of decreasing air pressure within the inner chamber to cause material to flow through the inlet port into the inner chamber, and increasing pressure on the material in the inner chamber to cause material to flow from the inner chamber through the outlet port to be dispensed by the dispensing system.

BRIEF DESCRIPTION OF THE DRAWINGS

For a better understanding of the present invention, reference is made to the drawings, which are incorporated herein by reference, and in which.

DETAILED DESCRIPTION OF ILLUSTRATIVE EMBODIMENTS

For purpose of illustration, the present invention will now be described with reference to a dispensing system, which is used to dispense viscous materials onto a substrate. One skilled in the art will appreciate, however, that embodiments of the present invention are not limited to dispensing systems that dispense viscous materials onto substrates, but rather, the dispensing apparatus and methods in accordance with embodiments of the present invention may be used in other applications requiring dispensing of a controlled amount of material from a container.

Figure 1:
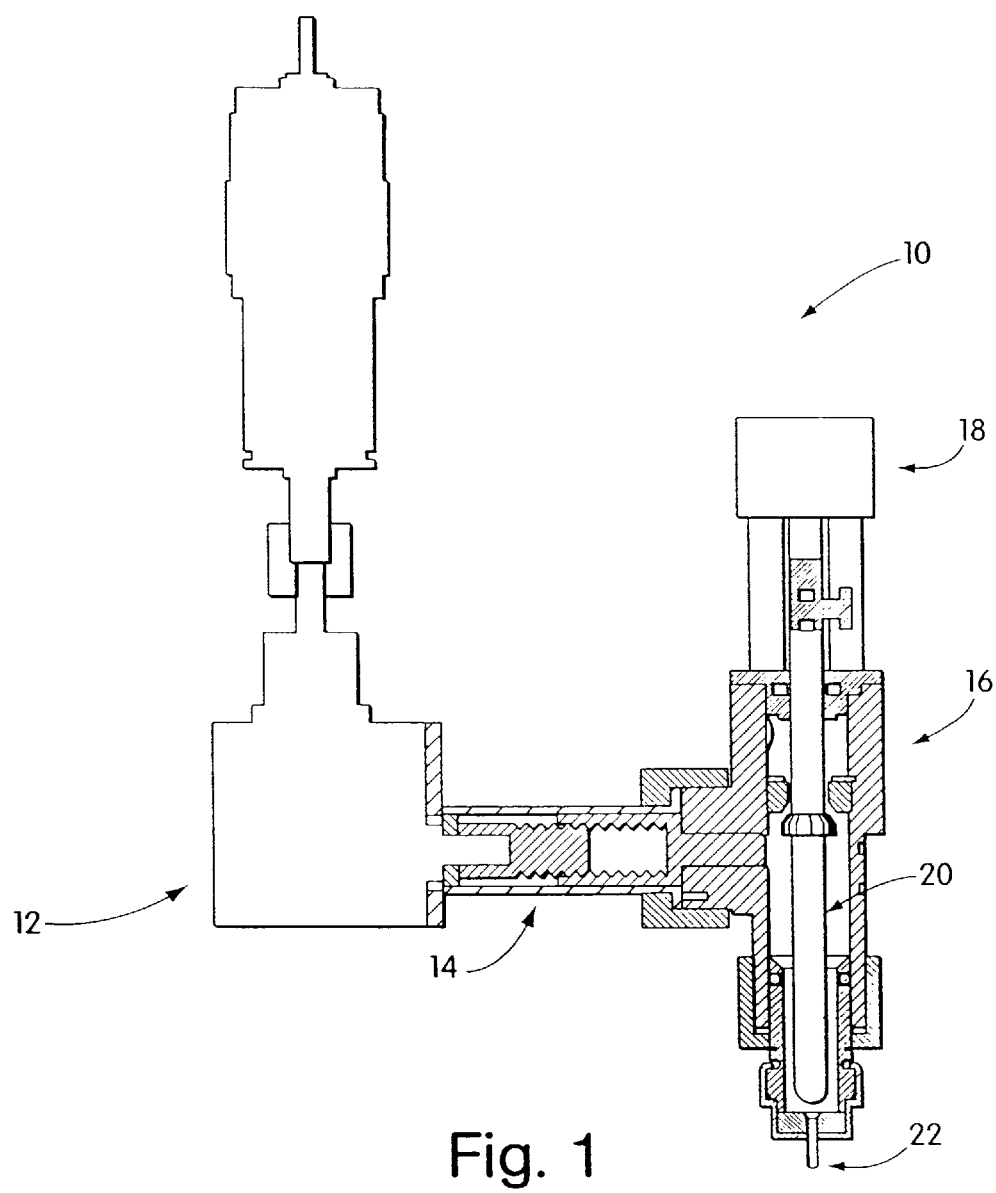
FIG. 1 is a drawing of a dispensing system in accordance with a first embodiment of the present invention.

Referring now to FIG. 1, a controllable liquid dispensing system 10 in accordance with a first embodiment of the present invention is shown. The liquid dispensing system 10 comprises a power control system 12 connected to a material control device 14, which is connected to a dispenser device 16. The material control device 14 cooperates and interacts with the dispenser device 16 to deliver a controlled volume of material through a dispensing tip 22 and onto a substrate (not shown). Within the dispensing device 16, there is present a sealing device 20, which is connected to a switching device 18. Using standard timing and control systems known in the art, the switching device can move the sealing device 20 from a first position which allows material to enter into the dispensing chamber, but not exit the dispensing tip 22; to a second position in which material is prevented from entering into the dispensing chamber, but may exit through the dispensing tip 22. The material is drawn into the dispensing chamber when the sealing device is in the first position by a vacuum created in the dispensing chamber by the material control device. The power control system 12 is a standard control system as is known in the art and is coupled to the material control device 14 to selectively determine the volume of material to be drawn into the chamber by displacing the material control device a selected distance. Once the material is drawn into the dispensing chamber, the switching device 18 moves the sealing device 20 to a second position. The material control device 14 is then returned to its original position forcing the material from the dispensing chamber through the dispensing tip 22 and onto the substrate.

Figure 2:
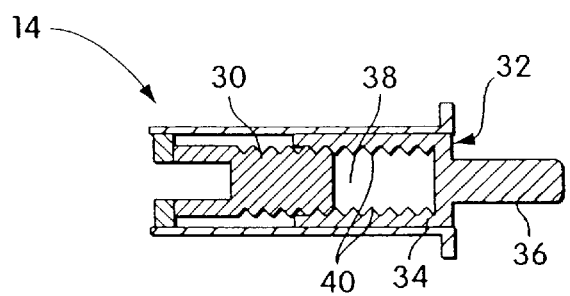
FIG. 2 is a cross-sectional view of a material control device used in embodiments of the present invention.

Referring now to FIG. 2, the material control device 14 can be seen in greater detail. In one embodiment, the material control device 14 comprises a screw 30 and a piston 32. Preferably, self lubricating materials and a fine threaded screw for greater control of piston movement are used. The piston 32 may comprise a first portion 34 and a second portion 36. The first portion 34 defines an opening 38 containing engagement teeth 40 to receive and mate with the screw 30. The second piston portion 36 extends into the material control device chamber 58 (See FIG. 3). In a preferred embodiment, a piston with a diameter of 0.250 inches is used. However, smaller or larger diameter pistons may be used depending upon the volume of material to be dispensed. Self lubricating and abrasive resistant materials are preferred.

By connecting the material control device 14 to a standard power control system, such as a servomotor, the rotation of the screw 30 can be controlled, so that when the screw mates with the piston 32, the second piston portion 36 is drawn away from the dispensing chamber and back through the material control device chamber 58 to create a vacuum within the chamber. The displacement distance of the second piston portion 36 can be controlled by the number of turns made to the screw 30. By controlling the distance of displacement of the piston portion 36, the amount of vacuum created in the chamber 58 and dispensing chamber 52 is also controlled. This in turn determines the amount of material which is drawn into the dispensing device 16 as will be shown herein.

Figure 3:
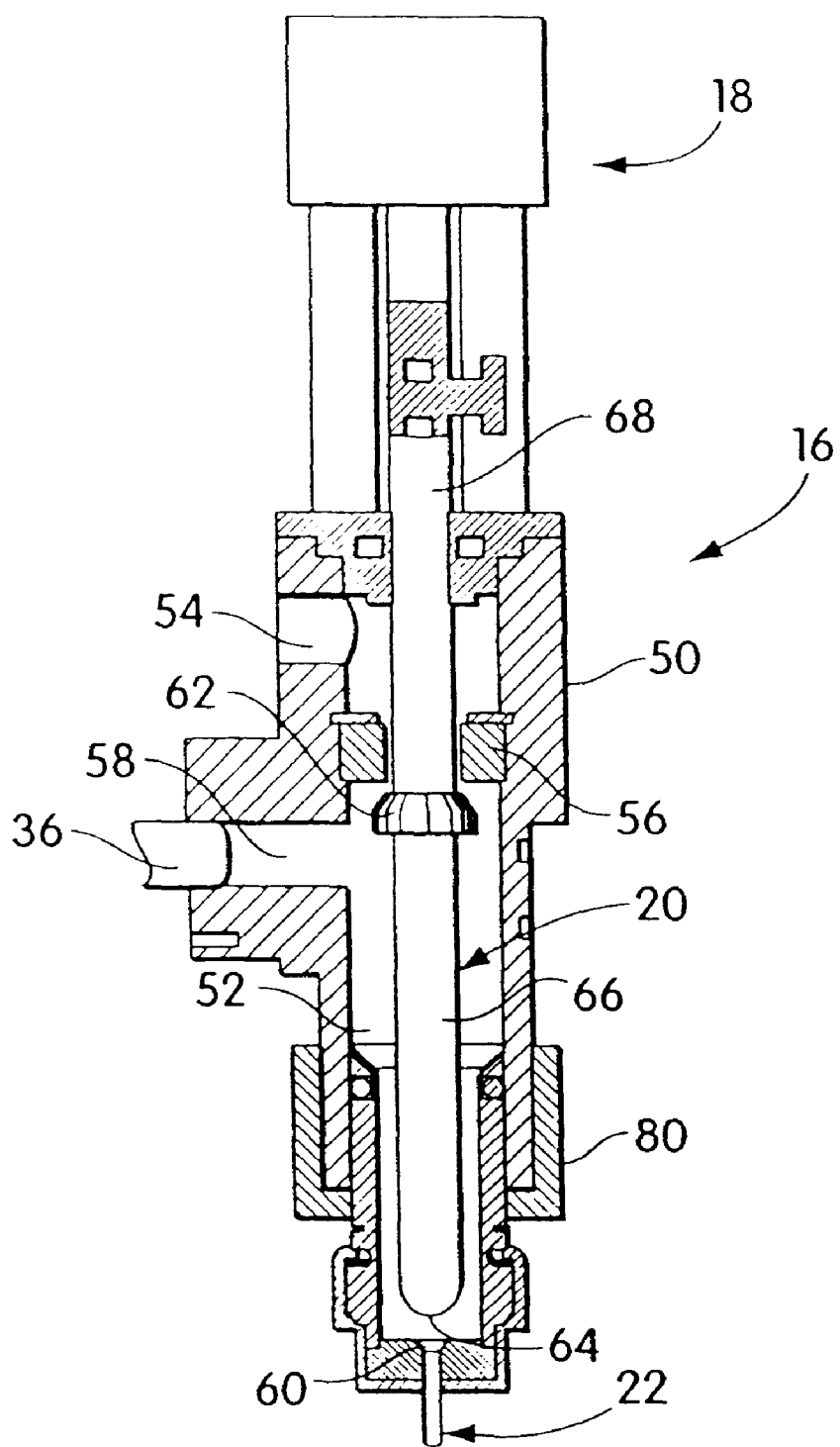
FIG. 3 is a cross-sectional view of a dispensing device and a switching device used in embodiments of the present invention.

Referring now to FIG. 3, the dispensing device 16, switching device 18 and sealing device 20 of the present invention are shown in greater detail. The dispensing device 16 comprises a housing 50 which defines a chamber 52 for receiving material, from an opening 54, which is to be dispensed through a second opening 60 and into a dispensing tip 22. The sealing device 20 extends the length of the chamber 52. The sealing device 20 includes a first sealing portion 62 and a second sealing portion 64 connected by interconnect arm 66. The entire sealing device 20 is in connection with the switching device 18. The switching device 18 may be implemented using a common switch or preferably a pneumatic cylinder which can be controlled through standard control systems that are known in the art. The switching device 18 could also be driven from a cam, a wedge or rack and pinion, or a motor and screw, similar to the device shown in FIG. 2. The sealing device 20 can be made from a range of material. For dispensing of abrasive materials, the sealing device may be made from tungsten carbide, ceramic, or other hard materials (or a combination of the above). For non abrasive materials, stainless steel or other suitable materials may be used.

It is preferred that the first sealing portion 62 of the sealing device 20 be located in a position which separates the opening 54 for the material entrance into the chamber 52 from the material control device chamber 58 and the material control device 14. In this manner, the first sealing portion 62 can create a seal between the material entrance opening 54 and the material control device chamber 58. In one embodiment, a retaining device 56 may be placed in the chamber 52 to assist in creating the seal with the first sealing portion 62 and also to prevent the first sealing portion 62 from rising to the level of the material entrance opening 54. The retaining device 56 may have tapered edges to assist in the sealing process. The retaining device may be any of those known in the art. The first sealing portion 62 may also be a ball and check valve or one of other similar sealing devices known in the art.

The sealing device 20 has a second sealing portion 64 connected by an interconnect arm 66 to the first sealing portion 62. This second sealing portion 64 seals the opening above the dispensing head or tip 22 to prevent material from dispensing from the chamber 52. The first sealing portion 62, second sealing portion 64 and interconnect arm 66 act in cooperation with each other so that when the switching device 18 moves, the sealing device 20 from a first position to a second position, one of the seals created by either the first sealing portion 62 or the second sealing portion 64 is in an open position and the other seal is in a closed position.

The dispensing device 16, switching device 18 and material control device 14 can all be assembled and connected through various fastening means known in the art such as clamps, screws, bolts, pins, etc. In this manner, the entire assembly allows for easy construction, repair and cleaning.

In an alternative embodiment, an adjustment device 80 can be placed at the base of the dispensing device 16. The adjustment device allows for changes in the opening length for larger volumes of fluid flow. The adjustment device 80 can comprise various known devices in the art such as screw on fasteners, twist caps, etc.

Figure 4C:
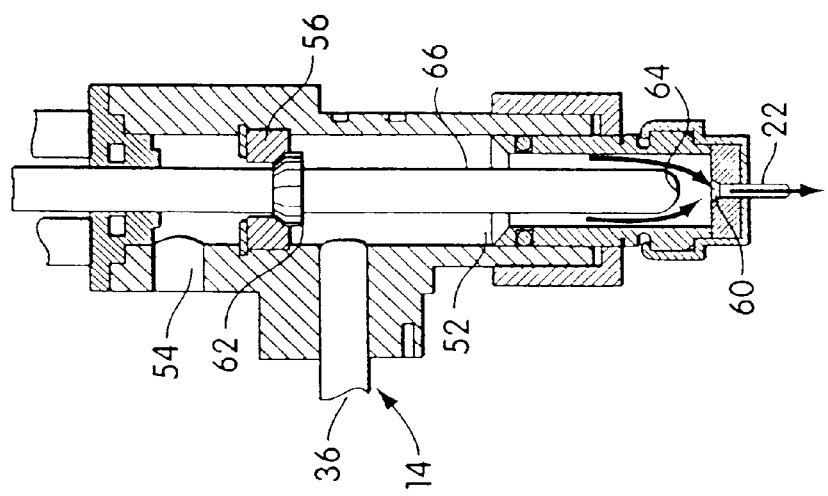
FIG. 4C illustrates the material control device and the sealing device cooperating in a second position to force material through a dispensing opening in the dispensing device.
Figure 4B:
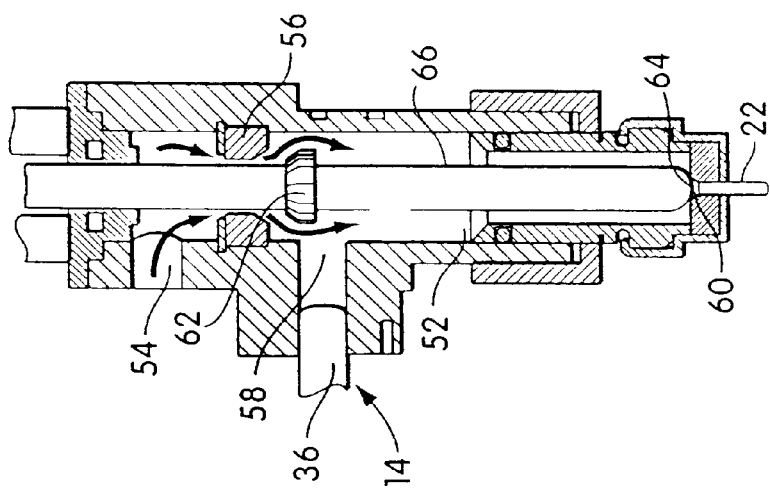
FIG. 4B illustrates the sealing device and material control device cooperating in a first position to draw material into the dispensing device.
Figure 4A:
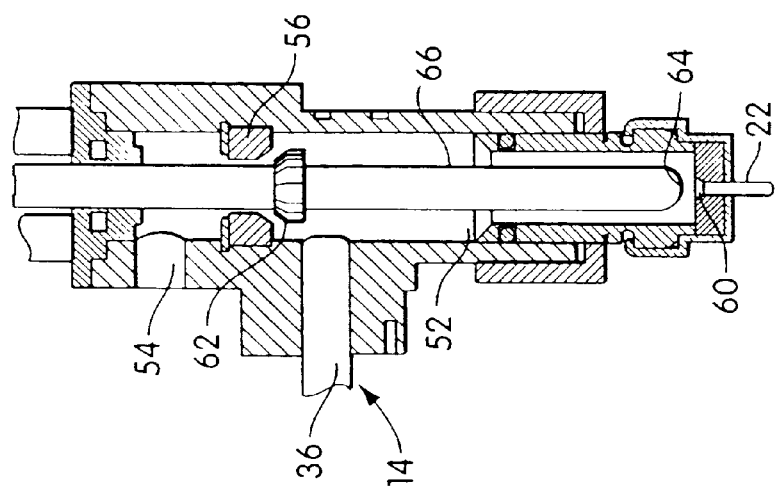
FIG. 4A illustrates a sealing device used in embodiments of the present invention in an initial purge position.
Figure 5:
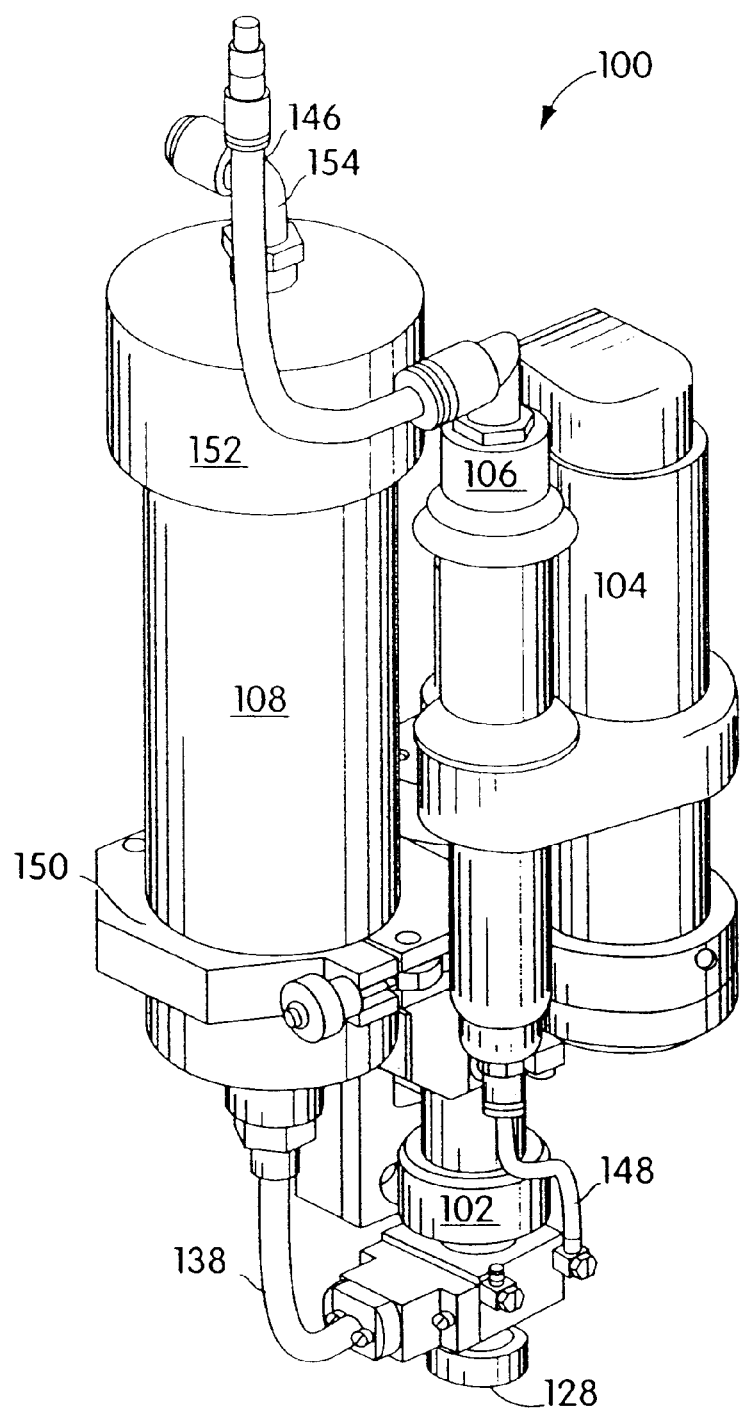
FIG. 5 is a drawing showing a perspective view of a dispensing system in accordance with a second embodiment of the present invention.
Figure 6:
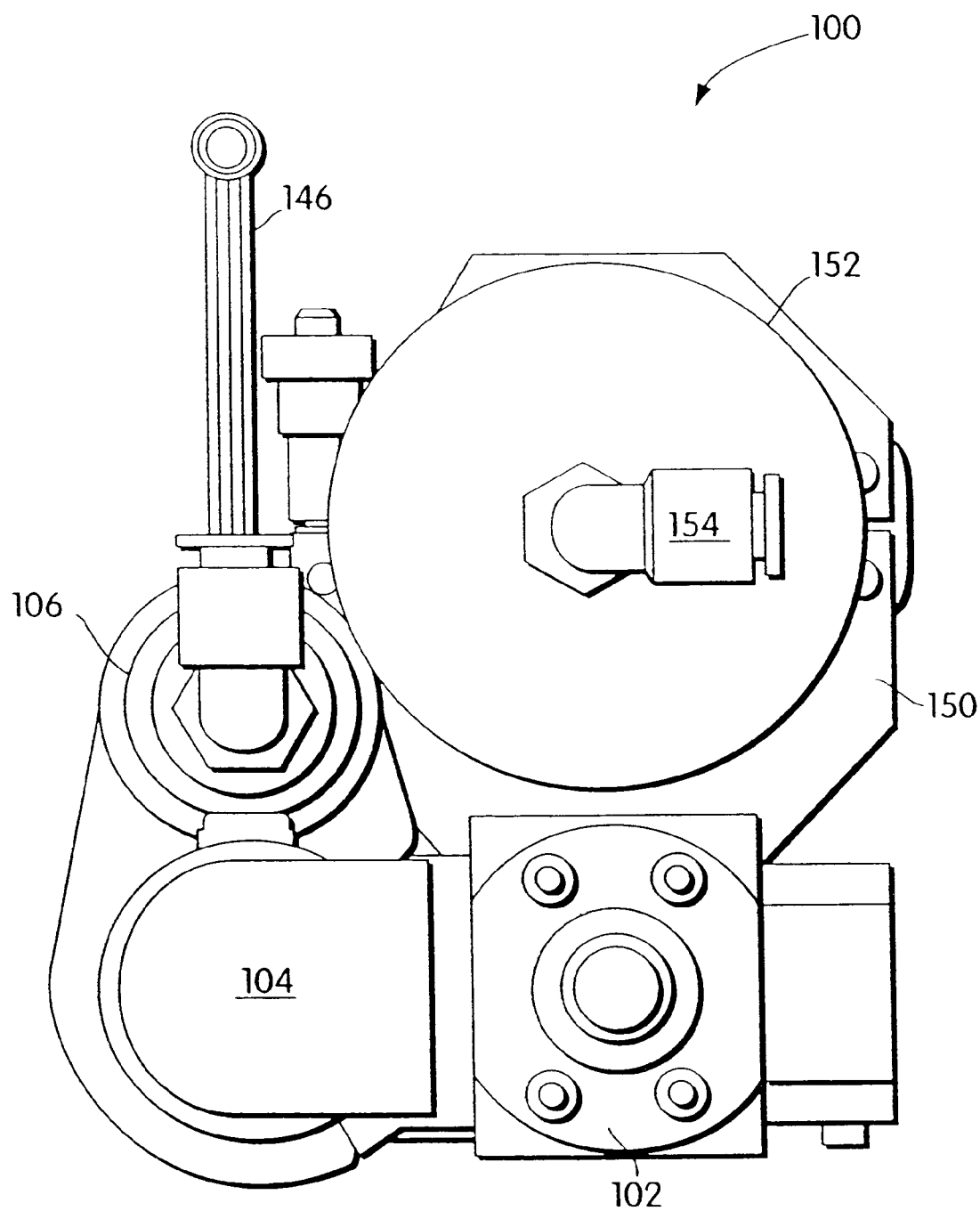
FIG. 6 is a top view of the dispensing system shown in FIG. 5.
Figure 7:
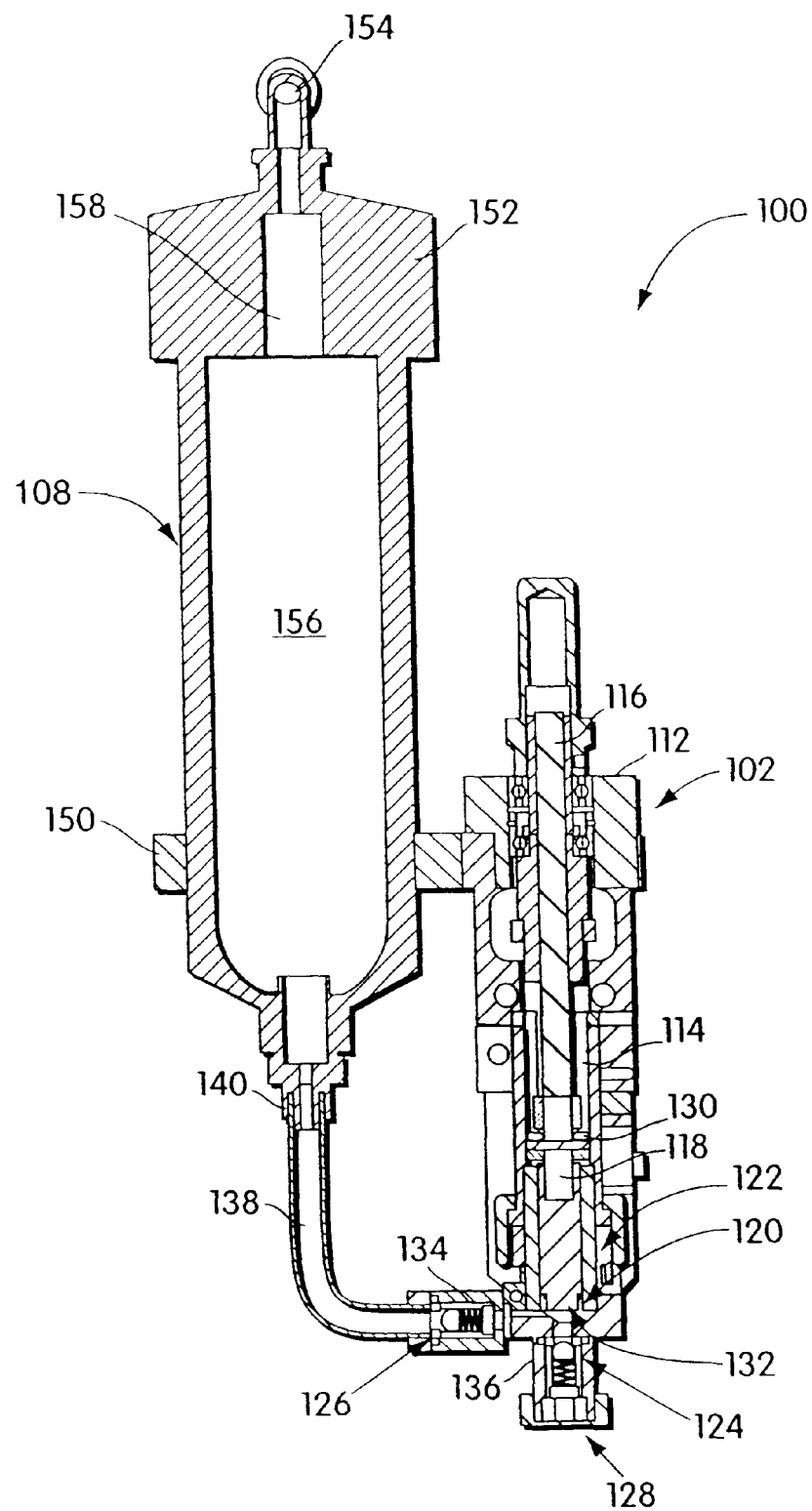
FIG. 7 is a cross-sectional side view of the dispensing system shown in FIG. 5.
Figure 8:
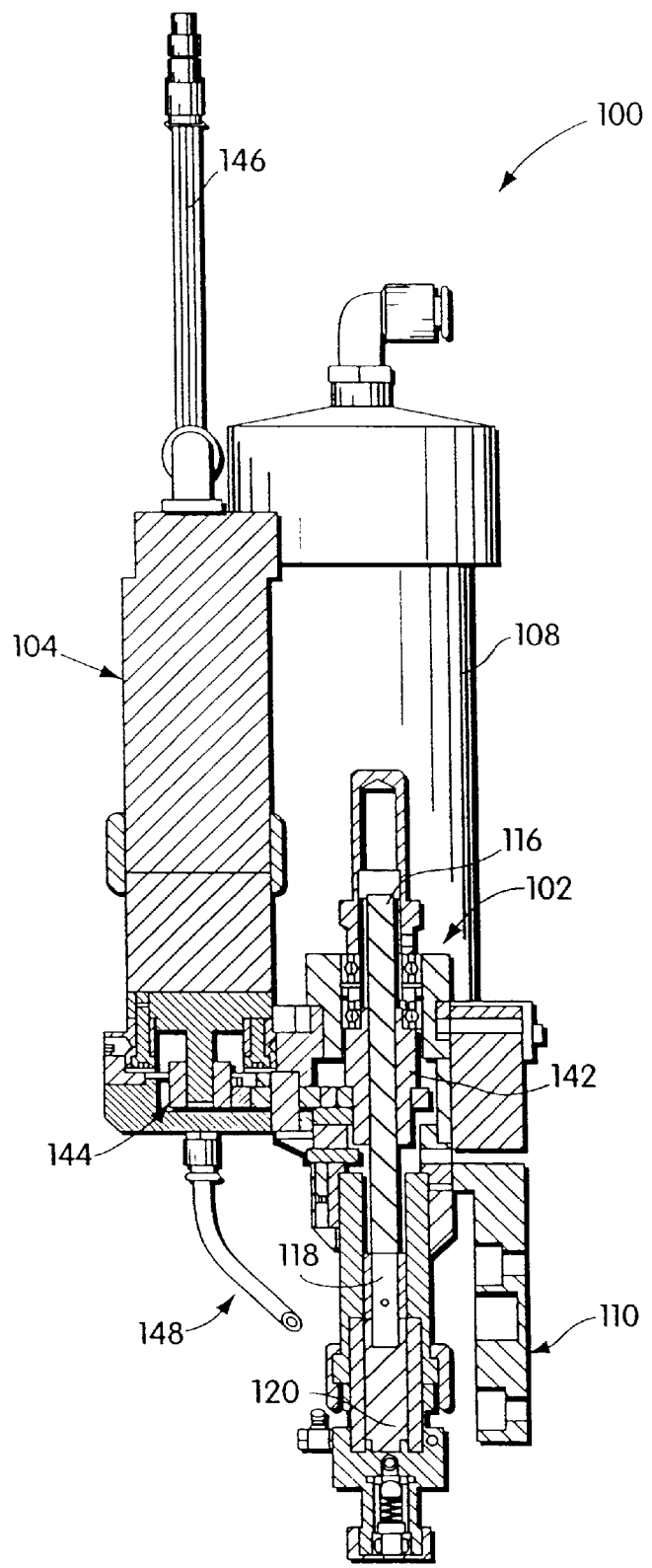
FIG. 8 is another cross-sectional side view of the dispensing system shown in FIG. 5.

Referring now to FIGS. 4A, 4B and 4C, the liquid dispensing device 10 of the present invention can be shown in operation. FIG. 4A illustrates the initial purge position of the dispensing device 10 before any material is entered into the chamber 52. A simple spacer device (not shown) is placed between the switching device 18 and the dispensing device 16. In doing so, this leaves the sealing device 20 in a half open/half closed position. The first sealing portion 62 and the second sealing portion 64 do not complete or form seals anywhere within the chamber 52. In this manner, material to be dispensed can be sent into the chamber 52 through opening 54 and pass through the entire length of the chamber 52 and exit through the dispensing tip 22 via opening 60. This process purges any air from the chamber prior to dispensing.

After the initial purge is complete, the switching device 18 brings the sealing device 20 to the first position where the second sealing portion 64 seals the opening 60 over the dispensing tip 22. In this position, the first sealing portion 62 does not form a seal and therefore allows an open pathway for material flow from the material opening 54 and into the lower portion of the chamber 52. When the sealing device 20 is in this position, the material control device 14 is compressed a predetermined distance by the power control 12. This creates a vacuum to draw material through the material opening 54 and material supply (not shown) into the chamber 52. The liquid material can flow past the sealing device first portion 62 and past the retainer 56 and into the lower area of the chamber 52. Once the selected volume of material enters into the lower portion of chamber 52, the material cannot escape from the dispensing device 16 since the opening 60 for the dispensing tip 22 is sealed by second sealing portion 64. Using standard timing and control systems known in the art, the switching device 18 moves the sealing device 20 to the second position after the volume of liquid has passed the first sealing portion 62. In this manner, the second sealing portion 64 is removed from the dispensing opening 60 which can allow for the material to escape and be dispensed onto the substrate (not shown). When the sealing device 20 and first sealing portion 62 are in the second position, the material control device 14 is returned to its initial position through the power control 12, preferably in the form of a servomotor. This returning force from the piston 36 and material control device 14 forces the liquid in the chamber 52 to be pushed through opening 60 and through dispensing tip 22 onto a substrate. The interaction of the material control device 14, the switching device 18 and the sealing device 20 allows for a distinct metered amount of liquid or paste to be provided to the substrate or depositing surface in a controlled manner.

Another embodiment of a liquid dispensing system 100 for a dispensing machine will now be described with reference to FIGS. 5–9. The dispensing system 100 is particularly useful for dispensing high viscosity, abrasive, encapsulation materials and cavity filling materials for which the weight of material dispensed is between 50 mg and 3 g.

The liquid dispensing system 100 includes a pump assembly 102, a motor assembly 104, a heater assembly 106, a syringe 108, and a mating bracket 110 to mount the liquid dispensing system to a gantry system of a dispensing machine.

The pump assembly 102 has an outer housing 112 and a substantially hollow interior section 114. Contained within the interior section is a ball screw 116 coupled to an adapter 118. The adapter is coupled to a piston 120. The ball screw and the piston are coupled to the adapter using screw threads. The piston resides within a cylinder 122, and the piston has a seal 132, made from a filled composite material, that provide a seal between the piston and the cylinder. In one embodiment, the ball screw is made from steel, and the adapter and piston are made from stainless steel. Anti rotation ball bearings 130 are mounted to the adapter. The ball bearings are implemented using a cross-drilled hole and pin, and they allow vertical motion of the adapter, ball screw and piston within the interior section of the pump assembly, while preventing horizontal motion and rotation.

The pump assembly 102 also includes an input channel 134, an output channel 136, a syringe adapter 138 and a nozzle 128. The input channel is disposed between the interior section of the pump assembly and the syringe adapter 138, and the output channel 136 is disposed between the interior section of the pump assembly and the nozzle 128. Material to be dispensed is input to the pump assembly through the input channel 134, and is output from the pump assembly through the output channel 136. The syringe adapter 138 is coupled to the syringe 108, using a Luer loc adapter, to receive material from the syringe. The nozzle 128 also includes a Luer loc adapter for mating with a dispensing pin or needle 162 shown in FIGS. 9A and 9B as is known in the art.

An inlet check valve 126 is disposed within the inlet channel 134, and an outlet check valve 124 is disposed within the outlet channel 136. Both the inlet check valve and the outlet check valve are implemented using ball and seat type valves having a closed position when the ball is disposed in the seat and having an open position when the ball is removed from the seat. Both the inlet check valve and the outlet check valve have springs that apply a spring force to the balls forcing the balls towards the seats. As discussed below in greater detail, the spring in the outlet check valve is a more robust spring, and provides a greater spring force than the spring in the inlet check valve. In one embodiment, carbide balls and seats are used for the check valves, and the springs are implemented using part #LC-014-C2 for the inlet valve and part #LC-026-C3 for the outlet valve, both of which are available from Lee Spring of Brooklyn, N.Y.

The pump assembly also includes a nut 142 disposed around the ball screw 116, such that the rotation of the nut causes vertical movement of the ball screw and piston. The nut 142 is coupled to a gear train 144 which is coupled to the motor assembly 104.

The motor assembly 104 is implemented in one embodiment using a brushless servo motor, such as model number 3556K024 available from MicroMo of Clearwater, Fla. In one application utilizing the liquid dispensing system 100, a dispensing machine has a computer controller coupled to the motor assembly to control the motor, and in turn, control the vertical movement of the piston to cause material to be dispensed from the liquid dispensing system.

The heater assembly 106 is implemented using a hot wire air flow element cartridge available from Conventronics of Havehill, Mass. The heater assembly has an inlet heater hose 146 that receives low pressure air, and the heater assembly has an outlet heater hose that provides heated air to a drilled passage in the housing. In several dispensing applications, it is desirable to dispense materials at a controlled elevated temperature onto substrates that are maintained at approximately the same controlled temperature as the material.

The syringe 108 is disposed within a mounting bracket 150 in the liquid dispensing, system 100. The syringe contains material 156 to be dispensed by the dispensing system. The syringe may be implemented using a disposal syringe or a refillable syringe. A syringe top 152 having an air line adapter 154 and an air channel 158 is used to provide an air tight seal over the top of the syringe. In one embodiment of the present invention, a pressurized air source is coupled to the air line adapter 154 to provide pressure to the material 156 in the syringe to force the material through the syringe adapter 138 and into the pump assembly 102. In one embodiment, the syringe or the syringe top includes a piston that extends into the syringe to force material from the syringe when air pressure is applied.

The operation of the liquid dispensing system 100 will now be described. There are two primary modes of operation for the liquid dispensing system, a loading mode and a dispensing mode. During operation of the liquid dispensing system, a constant air pressure is provided to the syringe through the air line adapter. In one embodiment, this air pressure is equal to approximately 90 PSIG. In the loading mode, the ball screw (and accordingly, the piston) are retracted (shown in FIG. 9A) by the motor assembly. As the piston is retracted by the motor, a partial vacuum is developed within the cylinder 122, and the pressure of the material 156 in the syringe causes the inlet check valve 124 to open and material to enter into the pump assembly. The spring tension of the spring in the outlet check valve is greater than that of the inlet check valve, so that the pressure provided by the material is not sufficient to overcome the spring tension of the spring in the outlet check valve. Accordingly, the outlet check valve remains closed during the loading mode of the dispensing system.

Figure 9A:
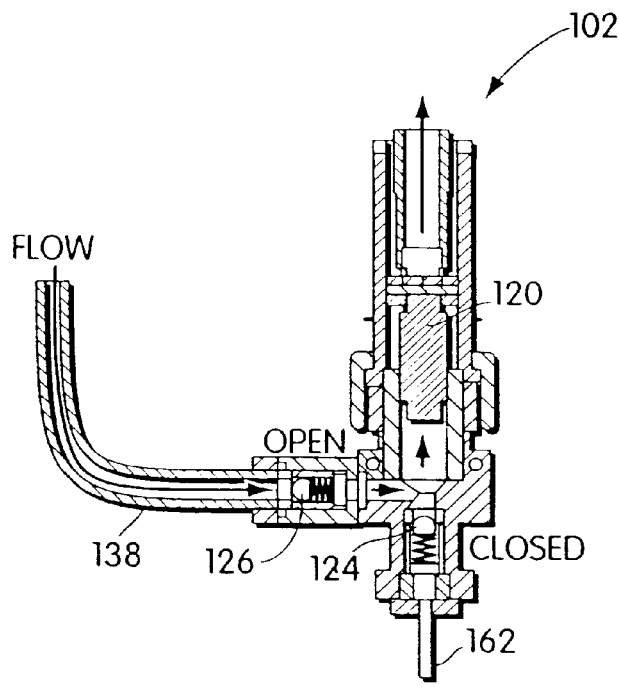
FIGS. 9A and 9B illustrate the operation of the dispensing system of FIG. 5.
Figure 9B:
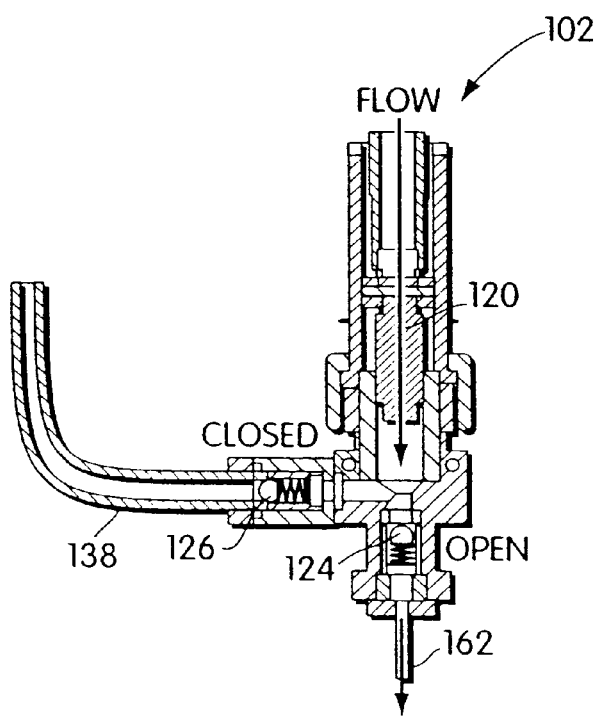

When the pump assembly is filled with material, and the dispensing system is set to dispense the material, the motor causes the piston 120 to be lowered, compressing the material within the pump assembly. When the pressure of the material in the pump assembly plus the spring tension of the spring in the inlet check valve, becomes greater than the pressure of the material in the syringe, the inlet check valve moves to the closed position. When the pressure of the material in the pump assembly becomes greater than the sum of the spring tension of the spring in the outlet check valve and the ambient atmospheric pressure, the outlet check valve moves to the open position. Once the outlet check valve moves to the open position, the dispensing system begins to dispense material, and will continue to dispense material until the piston 122 stops moving. FIG. 9B shows the pump assembly in the dispensing mode, near the end of a dispensing cycle.

The volume of material dispensed by the dispensing system 100 is controlled by the vertical distance that the piston is moved during a dispensing cycle. In one embodiment, the piston has a maximum stroke distance of 0.625 and the diameter of the piston is 0.375, resulting in a maximum dispensing volume per stroke of 1 cc. In another embodiment of the present invention, the piston and cylinder are replaceable with different size pistons and cylinders depending on the volume of material to be dispensed.

The time required to dispense material from the dispensing system 100 and the time required to recharge or fill the pump assembly with material depends on several factors including the viscosity and density of the material. In one embodiment, for typical underfill materials having a material density of 1.7 g/c, the time to dispense 7.5 g of material is approximately 1 second and the time required to fill the pump assembly with material is approximately 1.5 seconds.

The dispensing system 100 is particularly useful with a dispensing machine having an XY gantry system, such as those available from Camelot Systems, Inc. of Haverhill, Mass. In these dispensing machines, the dispensing system 100 may be mounted to the XY gantry system to locate the dispensing system above desired dispense locations on a substrate and to provide motion of the dispensing system during a dispensing operation. The motion of the dispensing system during dispensing of material allows a line, or some other geometrical shape of material, to be dispensed on the substrate. In one embodiment of the present invention, a 4-axis servo controller, such as that provided by Galil Inc. of Sunnyvale, Calif. having part #1040, is used in the dispensing machine to control the XY gantry system, and to control the motor assembly 104 of the dispensing system 100. In this embodiment, the operation of the motor and the motor assembly may be synchronized to the XY motion of the dispensing system by the servo controller.

Embodiments of the present invention described above include inlet and outlet check valves that are implemented using springs to control the opening and closing of the valves. As understood by those skilled in the art, embodiments of the present invention may include other types of valves with other control mechanisms.

Embodiments of the present invention described above use a piston to vary the effective volume of a cylinder to draw material into the cylinder and to force material from the cylinder. In other embodiments, the effective volume of the cylinder may be varied in other ways to achieve the same effect as the piston.

In one embodiment of the present invention, instead of expanding the volume to draw material into the cylinder, as in the dispensing system 100, a vacuum generator/compressor is used to decrease the air pressure within the cylinder and cause material to flow into the cylinder from the syringe. To subsequently dispense material from the cylinder, the air pressure applied to the cylinder from the vacuum generator/compressor is increased to force the material from the dispensing system.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only. It is not intended as limiting. The invention's limit is defined only in the following claims and the equivalents thereto.

What is claimed is:

1. A dispensing system for dispensing a quantity of material, the dispensing system comprising:

an inlet port to receive material;

an outlet port from which the material is dispensed from the dispensing system;

a housing including an inner chamber having an adjustable volume, a first opening through which material enters into the inner chamber, and a second opening through which material exits the inner chamber; a first valve operable in one of an open mode of operation and a closed mode of operation, the first valve being disposed between the inlet port and the first opening in such a manner that when the first valve is operating in the open mode, material may flow from the inlet port through the first opening into the inner chamber, and when the first valve is operating in the closed mode, material is prevented from flowing from the inlet port into the inner chamber;

a second valve operable in one of an open mode of operation and a closed mode of operation, the second valve being disposed between the outlet port and the second opening in such a manner that when the second valve is operating in the open mode, material may flow from the inner chamber through the second opening to the outlet port, and when the second valve is operating in the closed position, material is prevented from flowing from the inner chamber to the outlet port; and a reservoir to contain material for dispensing, the reservoir having an outlet coupled to the inlet port to provide the material for dispensing, and having an inlet to couple to a source of pressure to pressurize the material in the reservoir.

2. The dispensing system of claim 1, wherein the first valve is constructed and arranged such that the mode of operation of the first valve is controlled in part based on a difference in pressure of material being received in the inlet port and pressure of material in the inner chamber.

3. The dispensing system of claim 2, wherein the second valve is constructed and arranged such that the mode of operation of the second valve is controlled in part based on a difference in pressure of material in the inner chamber and ambient air pressure at the outlet port.

4. The dispensing system of claim 3, wherein the first valve includes a first spring providing a spring force that causes the first valve to operate in the closed mode of operation unless the pressure of the material in the inlet port is greater than the sum of pressure provided by the spring force and the pressure of material in the inner chamber.

5. The dispensing system of claim 4, wherein the second valve includes a second spring providing a spring force that causes the second valve to operate in the closed mode of operation unless the pressure of the material in the inner chamber is greater than the sum of pressure provided by the spring force of the second spring and the ambient air pressure at the outlet port.

6. The dispensing system of claim 5, wherein the spring force provided by the second spring is greater than the spring force provided by the first spring.

7. The dispensing system of claim 6, wherein the housing includes a piston movable within the inner chamber to vary the volume of the inner chamber.

8. The dispensing system of claim 7, wherein the housing includes a ball screw coupled to the piston.

9. The dispensing system of claim 8, further comprising a motor coupled to the ball screw through a coupling nut to control a position of the ball screw and to thereby control a position of the piston in the inner chamber.

10. The dispensing system of claim 9 wherein each of the first valve and the second valve is implemented using a ball and seat type valve.

11. The dispensing system of claim 1, wherein the housing includes a piston movable within the inner chamber to vary the volume of the inner chamber.

12. The dispensing system of claim 11, wherein the housing includes a ball screw coupled to the piston.

13. In a dispensing system having an inlet port to receive material, an outlet port from which the material is dispensed from the dispensing system, a housing including an inner chamber, a first opening through which material enters into the inner chamber, and a second opening through which material exits the inner chamber, and a reservoir that contains the material coupled to the first opening, a method of dispensing material including steps of:

applying pressure to the material in the reservoir;

decreasing pressure within the inner chamber to cause material to flow through the inlet port and first opening into the inner chamber; and increasing pressure on the material in the inner chamber to cause material to flow from the inner chamber through the second opening and the outlet port to be dispensed by the dispensing system.

14. The method of claim 13, wherein the step of decreasing air pressure includes a step of increasing a volume of the inner chamber, and wherein the step of increasing pressure includes a step of decreasing the volume of the inner chamber.

15. The method of claim 14, wherein the dispensing system further includes an inlet valve disposed in the inlet port and an outlet valve disposed in the outlet port, and wherein the step of decreasing air pressure includes a step of opening the inlet valve, and the step of increasing pressure includes steps of closing the inlet valve and opening the outlet valve.

* * * * *